United States Patent [19]
Griffin

[11] 3,828,171
[45] Aug. 6, 1974

[54] PROCESS APPARATUS CONTROL SYSTEM FOR OPTIMIZING OBJECTIVE VARIABLE QUALITY

[75] Inventor: Donald E. Griffin, Bartlesville, Okla.

[73] Assignee: Phillips Petroleum Company, Bartlesville, Okla.

[22] Filed: Aug. 14, 1972

[21] Appl. No.: 280,535

[52] U.S. Cl. .......................... 235/151.12, 208/164
[51] Int. Cl. ..................... C10g 13/00, G05b 15/02
[58] Field of Search .................. 235/151.12, 150.1; 208/164

[56] References Cited
UNITED STATES PATENTS

| | | | |
|---|---|---|---|
| 3,175,968 | 3/1965 | Berger | 235/151.12 X |
| 3,316,170 | 4/1967 | Stewart et al. | 208/164 |
| 3,602,701 | 8/1971 | Boyd | 235/150.1 |

Primary Examiner—Eugene G. Botz
Attorney, Agent, or Firm—Neuman, Williams, Anderson and Olson

[57] ABSTRACT

A procedure for on-line optimization of the operation of a petroleum catalytic cracking apparatus through control of six operational variables is disclosed using a linear model centered on the present operating condition of the apparatus. Minimum and/or maximum limits are placed on the controlled variables and certain other variables representing operational parameters of the apparatus and move limits are imposed on the controlled variables. The linear model is updated each time the optimization procedure is performed and the simplex technique is used to determine the values of the controlled variables required for optimization.

10 Claims, 2 Drawing Figures

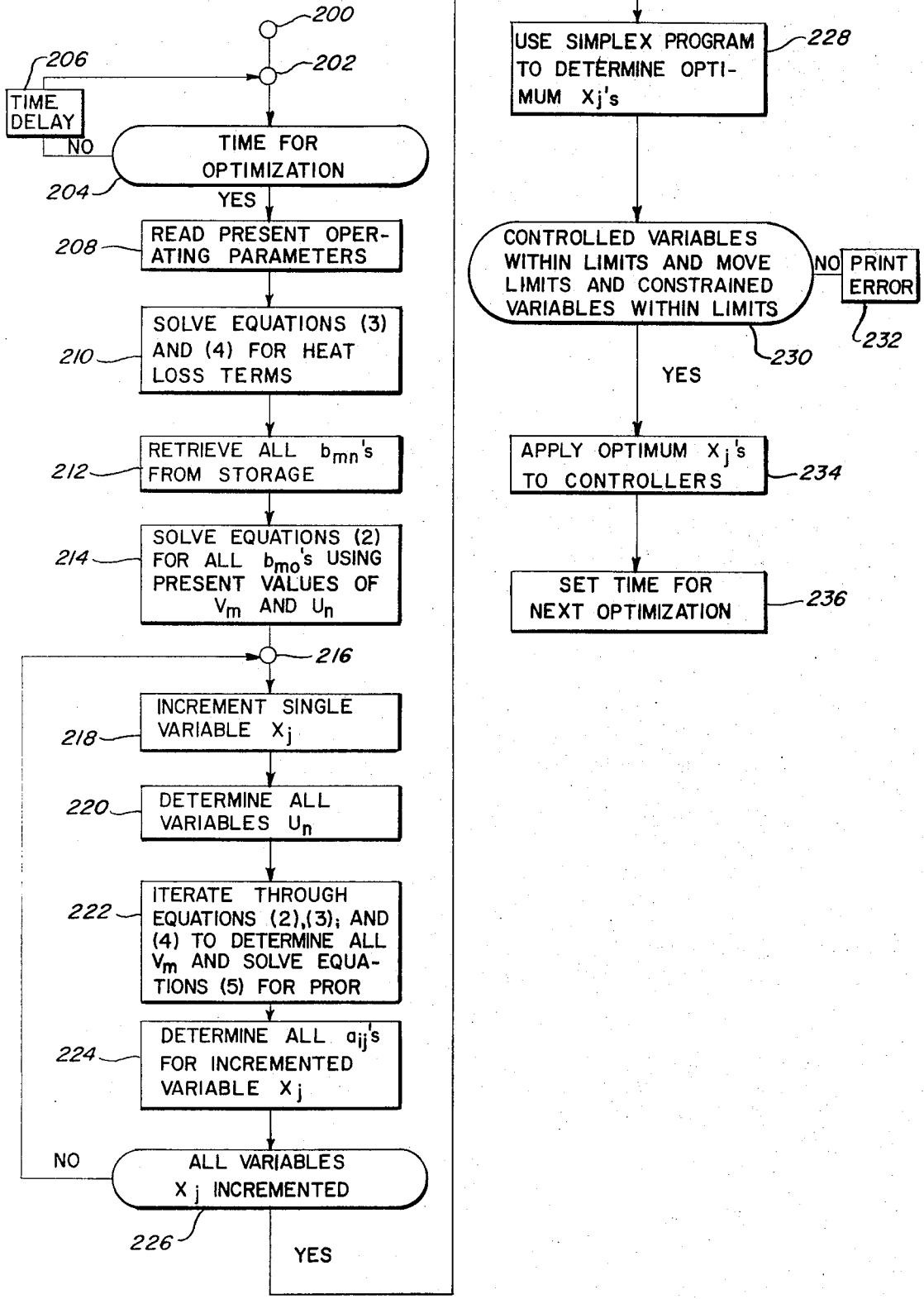

PROCESS APPARATUS CONTROL SYSTEM FOR OPTIMIZING OBJECTIVE VARIABLE QUALITY

BACKGROUND OF THE INVENTION

This invention relates to methods and apparatus for control and optimization of the operation of a chemical process apparatus and, in particular, relates to systems for on-line optimization of a petroleum catalytic cracking apparatus.

A catalytic cracking apparatus may be comprised of a number of individual units with the operation of any one such unit being heavily dependent on the operation of the others. Thus, a single catalytic cracking apparatus might include a main catalytic cracker or reactor for breaking the petroleum feed stock into various components, a catalyst regenerator, an air compressor for supplying air to the regenerator, a source of stripping steam, and so forth. Moreover, a fractionator will normally be closely associated with the cracking apparatus for separating the cracked products. Each unit may be envisioned as receiving one or more input or feed streams and operating on those input streams in some manner to produce one or more output or product streams. Each unit may include one or more adjustable elements or control parameters for altering the processing performed by that unit on the feed streams in order to alter the nature of the output stream. Moreover, each unit may have various constrained operational parameters which must be maintained within some limits in order for that unit to function properly. Such parameters might include the temperature of the material within the unit or the flow rates of either the input or output streams. Thus, as one or more parameters of an input stream to any individual unit are altered, it may be desirable to alter the control parameters of that unit or some other unit to maintain its operational parameters within desired limits or to alter the nature of its output stream in some desired manner.

Further, it is normally desirable to operate cracking apparatus in an optimum manner. The definition of the optimum manner may vary, but most often it is desired to maximize the rate at which profit is produced by operation of the apparatus. The profit rate of any single cracking apparatus is, of course, dependent upon a number of variables including the rates of utilization of the various inputs to the apparatus, the cost of the input quantities, the rates of generation of the output quantities, and the prices at which the output quantities may be sold or, in some cases, the costs of disposing of the output quantities. The inputs to the apparatus include not only the petroleum feed, but also such quantities as the power required to operate certain ones of its components, the necessary stripping steam, and the rate at which its various components depreciate with use. Thus, for example, for any fresh feed supply of fixed composition, a cracking apparatus may be operated in a number of different ways, each way resulting in a particular combination of output stream compositions and rates and, thus, a particular profit rate. Altering the way in which the apparatus is operated may alter the profit rate; it is most often desirable to select the manner of operation such that profit rate is maximized.

Many systems have been proposed in the past for optimizing the operation of catalytic cracking apparatus, but these prior systems have had various deficiencies associated therewith. In particular, they have often been capable of optimizing operation over only a relatively small number of variables. For example, U.S. Pat. No. 3,175,968 to D. E. Berger entitled Automatic Control and Optimization of a Fluidized Catalytic Cracker, which issued on Mar. 30, 1965, shows a catalytic cracker optimization system wherein only two variables, the catalytic reactor bed temperature and the catalytic reactor bed level, are controlled to optimize the operation of the cracking unit. However, as stated in that patent, the primary variables in the operation of a fluidized cracking unit are the temperatures in the reactor and regenerator beds, the reactor catalyst bed level, the temperature of the feed stream, the rate of flow of the feed stream, the rate of catalyst flow, the rate of air flow to the regenerator, the residence time of the feed in the reactor, and the percent of reactor output which is recirculated from the fractionator through the reactor. In many instances it is desirable to optimize operation of the cracking unit over many or all of these variables.

Further, many previously proposed catalytic cracker optimization systems have assumed that an optimum result was achieved when one of the operating variables in the cracker was maintained at a predetermined level. For example, U.S. Pat. No. 3,316,170 to W. S. Stewart, et al., entitled Control System for Maximum Heat Utilization in Process for Fluid Catalytic Decomposition Conversion of Hydrocarbons, which issued on Apr. 25, 1967, discloses a system for controlling the operation of a catalytic cracker wherein the temperature of the catalytic reactor bed is maintained at its maximum allowable level. However, the assumption that maintaining an operating variable at a fixed level will result in truly optimum operation of the cracking unit is often erroneous.

Optimization systems in general require that a mathematical model be constructed of the system to be optimized. As will be apparent, a catalytic cracking apparatus is a relatively complex system. Thus, many optimization systems of the past have used mathematical models thereof which were highly complex. Such models have proven to be difficult to work with mathematically. Moreover, such models often predict the operation of the apparatus with an acceptable degree of accuracy only within a relatively narrow range of operating conditions of the apparatus. If the point of optimal operation of the apparatus falls outside this range, the system using the model is unable to determine the optimum operating point. While some prior systems provided means for altering the model in accord with the operating condition of the apparatus, i.e., for updating the model, the updating procedures were often unnecessarily complex.

Additionally, some of the catalytic cracker optimization systems known to the prior art have contained no provisions for achieving smooth transitions toward the optimal operating condition. Thus if the system determined that a relatively large alteration in one of the operating parameters of the unit was required, the system was not capable of insuring that the alteration was made slowly enough that no undesirable transient conditions were introduced into the operation of the cracking apparatus.

SUMMARY OF THE INVENTION

This invention provides methods and apparatus for optimizing the operation of a process apparatus and, in particular, a petroleum catalytic cracking apparatus, through control of certain operational variables making use of a linear model centered at any time on the operating conditions then existing in the apparatus. In accord with this invention, maximum and/or minimum limits as well as move limits are imposed on the directly controlled variables, and maximum and/or minimum limits are imposed on other variables representing operational parameters of the apparatus. Means are provided by the invention for updating the linear model each time the optimization is performed. Further in accord with the invention, the simplex technique is used on the linear model to determine the value of the controlled variables required to optimize operation of the apparatus.

Thus, it is an object of this invention to provide methods and apparatus for optimizing the operation of a process apparatus.

It is an object of this invention to provide methods and apparatus for optimizing the operation of a petroleum catalytic cracking apparatus.

It is an object of this invention to provide methods and apparatus for optimization of the operation of a catalytic cracking apparatus wherein the optimization is performed over a relatively large number of controlled variables.

It is an object of this invention to provide methods and apparatus for optimization of the operation of a catalytic cracking apparatus making use of a linear model of relatively simple form.

It is an object of this invention to provide methods and apparatus for optimization of the operation of a catalytic cracking apparatus using a model which describes the operation of the cracking apparatus with a high degree of accuracy over a relatively wide range of operating conditions of the cracking apparatus.

It is an object of this invention to provide methods and apparatus for optimizing the operation of a catalytic cracking apparatus using a linear model and including means for easily updating the model.

It is an object of this invention to provide methods and apparatus for optimizing the operation of a catalytic cracking apparatus including means for insuring relatively smooth transitions toward the optimum condition.

It is an object of this invention to provide a system for optimizing the operation of a catalytic cracking apparatus fulfilling the above-named objects and further characterized by simplicity of design, ease of operation, and economy in execution.

Further and additional objects and advantages of this invention will be apparent from the description, accompanying drawing, and appended claims.

DESCRIPTION OF THE DRAWING

FIG. 2 is a simplified flow diagram of a computer program which may be used to implement a control system of this invention.

DESCRIPTION OF THE PREFERRED EMBODIMENT

Figure 1:
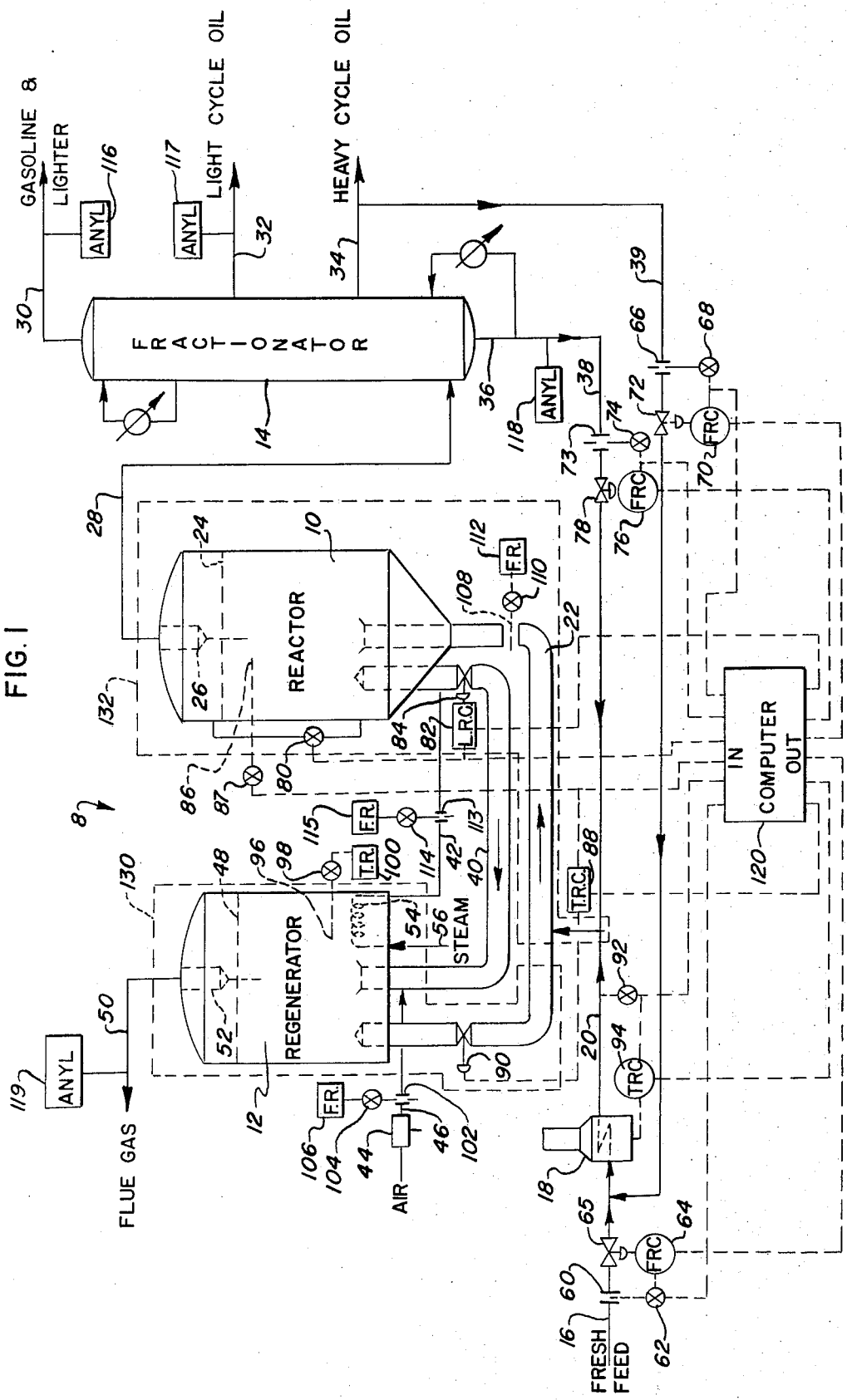
FIG. 1 is a drawing in schematic and block form of a catalytic cracking apparatus and a fractionator associated therewith and including a control apparatus of this invention.

A preferred embodiment of this invention will be described with reference to a particular fluidized bed petroleum catalytic cracking apparatus shown in diagrammatic form in FIG. 1. As will be apparent to those skilled in the art, this invention may be applied to many types of process apparatus other than that shown in FIG. 1.

The catalytic cracking apparatus 8 of FIG. 1 is a fluidized apparatus and is comprised of a catalytic reactor 10 and a catalyst regenerator 12. A fractionator column 14 is provided for operation in conjunction with the cracking apparatus. Fresh feed or charge stock in the form of liquid petroleum or petroleum product is supplied to the cracking apparatus through a conduit 16. The feed is heated and vaporized in a feed preheater 18 and injected through a conduit 20 into a catalyst conduit 22. The conduit 22 contains therein a flow of fluidized catalyst particles at relatively high temperature passing from regenerator 12 into reactor 10 and forming a fluidized bed having a level 24 within the reactor. The vaporized fresh feed is conveyed into the reactor by the fluidized stream in conduit 22. The feed stream is cracked into various component parts inside the reactor, the heat required for cracking being generated in regenerator 12 and conveyed to the reactor by the flow of catalyst through conduit 22. The resultant vapors pass through a cyclone 26 and into conduit 28. The cyclone removes most of the catalyst particles which might otherwise be carried by the petroleum vapors as they pass into conduit 28.

From conduit 28, the vapors are supplied to fractionator column 14 and there separated into their various component parts. A plurality of product streams are withdrawn from the fractionator. A stream of gasoline and lighter components is withdrawn as the top product through a conduit 30; a stream of light cycle oil (LCO) is withdrawn through a conduit 32; a stream of heavy cycle oil (HCO) is withdrawn through a conduit 34; and a stream of bottom product or slurry is withdrawn through a conduit 36. A portion of the slurry is recycled to fractionator 14, while the remainder of the slurry is introduced into catalyst conduit 22 through a conduit 38 along with the heated feed in conduit 20. Some or all of the heavy cycle oil withdrawn through conduit 34 may be recirculated through the cracking apparatus by delivering it through conduit 39 to conduit 16 where it is combined with the fresh feed and vaporized in preheater 18.

As a product of the reaction occurring in reactor 10, a layer of coke is deposited on the catalyst particles contained therein. In order to remove that coke so that the catalyst may be reused, catalyst is removed from reactor 10 and delivered to regenerator 12 through a coke conduit 40. As with catalyst conduit 22, the material in coke conduit 40 is in fluidized form. A stream of stripping steam is injected through conduit 42 into coke conduit 40 and in a direction of flow opposed to that of the coke-laden catalyst particles. The stripping steam removes any liquid petroleum products which may be associated with the coke-laden catalyst particles and returns those liquid products to the reactor. A stream of air is also injected through a compressor 44 and a conduit 46 into coke conduit 40 and in a direction of flow parallel to that of the coke-laden catalyst particles. A bed of fluidized coke-laden catalyst particles having a level 48 is formed within the regenerator. The air supplied through conduit 46 provides the vapor required to fluidize the catalyst particles. That air also combines with the coke on the catalyst particles to support a combustion reaction in regenerator 12, thus removing the coke from the catalyst particles. The gaseous porducts of combustion are removed from the top of regenerator 12 through a conduit 50. A cyclone 52 is included in the regenerator to remove any catalyst particles which might otherwise be carried by the vapor into conduit 50. Regenerator 12 also includes a set of coils 54 disposed within the fluidized bed. Steam is injected into those coils through a conduit 56 and is superheated to form the stripping steam injected into coke conduit 40 through conduit 42. The superheated steam may also be used to supply many other plant needs.

As thus far described, the catalytic cracking apparatus and fractionator of FIG. 1 are conventional. Details thereof are well known to those having ordinary skill in the art and they need not be further described here. It is to be understood, however, that the apparatus of FIG. 1 is to be well regulated. By well regulated it is meant that the apparatus will establish and maintain within relatively narrow tolerances a desired operating condition as determined by the persons controlling its operation.

In order to achieve the desired regulation, a number of control devices are included within the apparatus of FIG. 1. An orifice flow meter 60 is disposed in conduit 16 for measuring the rate at which fresh feed is supplied to the cracking apparatus. A transducer 62 converts the output of orifice meter 60 into a form capable of use by a flow recorder-controller 64 which determines the difference between the flow rate through conduit 16 and a desired or set point value for the flow through that conduit. A valve 65 alters the rate of flow through conduit 16 in accord with that determined difference. A similar combination of an orifice meter 66, a transducer 68, a flow recorder-controller 70, and a valve 72 is associated with conduit 39 to maintain the rate of heavy cycle oil recirculation at a set point value. Another similar combination of an orifice meter 73, a transducer 74, a flow recorder-controller 76, and a valve 78 is associated with conduit 38 to maintain the rate of slurry recirculation at a set point value. A differential pressure transducer 80 is provided to measure the level of the bed in reactor 10. Its output is applied to a level recorder-controller 82 which actuates a valve 84 disposed in coke conduit 40 and determining the rate at which coke-laden catalyst is withdrawn from reactor 10 in order to maintain the reactor bed level at a set point value. A temperature sensing element 86 is located within the reactor bed to sense its temperature and, in combination with a transducer 87, a temperature recorder-controller 88, and a valve 90 located in catalyst conduit 22 for controlling the rate at which catalyst is delivered to reactor 10, maintains the temperature within the reactor bed at a set point value. Additionally, the combination of a temperature sensing element disposed in conduit 20 to measure the temperature of the fluid passing therethrough, a transducer 92, and a temperature recorder-controller 94 operative to determine the rate at which heat is delivered by feed preheater 18 to the feed passing therethrough, maintains the temperature of the feed in conduit 20 at a set point level. A control system may also be associated with fractionator 14 to insure that it is operated in a desired manner. Such a control system is fully disclosed in the application of Donald E. Griffin, Byron T. Brown, and William H. Williams entitled Fractionator Column Control System, filed concurrently herewith and assigned Ser. No. 280,536.

There is also included in the apparatus of FIG. 1 for reasons which shall subsequently become apparent a plurality of other sensing devices. A temperature sensing element 96 is located within the bed in regenerator 12 and is operative through a transducer 98 to drive a temperature recorder 100. An orifice meter 102, a transducer 104, and a flow recorder 106 are operative to provide a reading of the rate of air flow through conduit 46 into regenerator 12; an orifice meter 108, a transducer 110, and a flow recorder 112 are operative to provide a reading of the rate of catalyst flow through catalyst conduit 22 into reactor 10; and an orifice meter 113, a transducer 114 and a flow recorder 115 are operative to provide a reading of the rate of stripping steam flow through conduit 42. A first chromatographic analyzer 116 is operative to analyze the contents of the petroleum products flowing through conduit 30 and a second chromatographic analyzer 117 is operative to analyze the contents of the petroleum products flowing through conduit 32. An analyzer 118 is associated with conduit 38 to measure the specific gravity of the slurry flowing therethrough and an analyzer 119 is associated with conduit 50 to analyze the composition of the flue gas flowing through it.

Turning now to the system used to obtain optimum operation of the cracking apparatus of FIG. 1, optimum operation of the apparatus is defined as that which maximizes the rate at which profits are generated through the operation of the apparatus as measured in dollars per day. Optimum operation is normally so defined, but it may be defined in alternative manners. For example, in some instances it may be desirable to maximize the rate of production of one of the fractionator output streams or one component in one of the fractionator output streams.

The rates of formation of the products formed as a result of the processes in cracking apparatus 8 and fractionator 14 are needed to determine the rate at which profit is generated (hereinafter PROR) by operation of the cracking apparatus. The products formed by the cracking apparatus of FIG. 1, with the symbols used herein to represent their rate of formation, are as follows:

| | |
|---|---|
| Ethane and lighter | $(C_2^-R)$; |
| Propene | $(C_3^=R)$; |
| Propane | $(C_3R)$; |
| Butene | $(C_4^=R)$; |
| Isobutane | $(iC_4R)$; |
| Normal butane | $(nC_4R)$; |
| Butane-free gasoline | (BFGR); and |
| Coke | (COKER). |

Six variables or operational parameters of the cracking apparatus are selected for control of the operation of the apparatus of FIG. 1, the rate at which fresh feed is supplied through conduit 16 (FFR), the rate at which heavy cycle oil is recycled to the cracking apparatus through conduit 39 (HCORR), the rate at which slurry is recycled to the cracking apparatus through conduit 38 (SLURR), the temperature in the bed of reactor 10 (RXTEMP), the level of the bed in reactor 10 (RXLEV), and the temperature to which the fresh feed and recycled heavy cycle oil are heated in feed preheater 18 (FTEMP). Minimum and maximum limits are imposed on each of these controlled variables. The limits are most often related to maximum levels which the various components of the cracking apparatus are capable of handling, such as maximum flow rates or maximum temperatures, or minimum levels which are required for the unit to maintain the required regulation. As to any individual variable, however, other considerations may be used to determine the desired allowable limits.

Move limits as well as minimum and maximum limits are also imposed on the controlled variables. Thus, the absolute rates of changes of these variables are required to be below certain levels. This insures that the unit will not be upset or placed in an undesirable transient or unstable condition by attempting to alter its operating parameters too rapidly. It insures that the unit will make smooth or bumpless transitions from one operating condition to another. Moreover, as will be seen subsequently, the imposition of move limits insures that the model of the cracking apparatus used with the optimization procedure will predict with acceptable accuracy the operating characteristics of the cracking apparatus.

Six other variables associated with the cracking apparatus of FIG. 1 are selected as constrained variables. No direct control of these variables is maintained, but they are also restricted by limiting values. For the described system, the six constrained variables are the light cycle oil fifty percent point, i.e., the temperature at which 50 percent of the light cycle oil yielded through conduit 32 would be distilled off at some specified pressure (LCOTEMP), the rate at which light cycle oil is withdrawn from the fractionator through column 32 (LCOYIELD), the rate at which air is supplied to the regenerator through conduit 46 (AIRR), the temperature in the bed of regenerator 12 (RGTEMP), the specific gravity of the slurry in conduit 38 (SLUSG), and the rate at which catalyst is circulated through catalyst conduit 22 into the reactor (CATCR). Maximum and minimum limits are placed on LCOTEMP, maximum limits are placed on LCOYIELD, AIRR, and RGTEMP, and minimum limits are placed on SLUSG and CATCR. The considerations entering into the establishment of the limits on the constrained variables are similar to those mentioned above in relation to the controlled variables.

The optimization procedure of this invention will determine the set points which should be applied to flow recorder-controllers 64, 70 and 76, level recorder-controller 82, and temperature recorder-controllers 88 and 94. A computer network 120 is used to generate a mathematical model of the FIG. 1 apparatus and determine those set points. As indicated in FIG. 1, outputs from computer network 120 representative of the determined set points are applied to recorder-controllers 64, 70, 76, 82, 88 and 94. Also as indicated in FIG. 1, signals from transducers 62, 68, 74, 80, 87 and 92 and representative of the conditions measured by their associated sensing units, and thus of the operating condition of the cracking apparatus, are supplied to computer network 120. Further information about the current operation of the cracking apparatus is supplied computer network 120 in the form of signals from transducers 98, 104, 110, and 114, and analyzers 116, 117, and 118, each signal being representative of the condition measured by its associated sensing unit, by means not indicated in FIG. 1. Chromatographic analyzers 116 and 117 in particular supply signals representative of the present values of $C_2^=R$, $C_3^=R$, $C_3R$, $C_4^=R$, $iC_4R$, $nC_4R$, and BFGR.

The mathematical model used by computer network 120 is linear and of the form:

$$Y_i = a_{io} + \Sigma a_{ij} X_j$$
$$LL_j \leq X_j \leq UL_j$$
$$LL_i \leq Y_i \leq UL_i$$

(1)

The independent variables, $X_j$, are the controlled variables, FFR, HCORR, SLURR, RXTEMP, RXLEV, and FTEMP. The dependent variables, $Y_i$, are the quantity to be optimized, also termed the objective variable, PROR, the constrained variables, LCOTEMP, LCOYIELD, AIRR, RGTEMP, SLUSG, CATCR, and production rate variables $C_2^=R$, $C_3^=R$, $C_3R$, $C_4^=R$, $iC_4R$, $nC_4R$, and BFGR and COKER. The terms $LL_i$ and $UL_i$ are the lower and upper limits placed on the constrained variables, $Y_i$, but, as discussed above, all of those variables but one will have only an upper or a lower limit. The terms $LL_j$ and $UL_j$ are the limits placed on the controlled variables $X_j$. For each of the controlled variables, $LL_j$ is the greater of the lower limit placed on that variable and the minimum value permitted by the move limit, while $UL_j$ is the lesser of the upper limit placed on that variable and the maximum value permitted by the move limit. The terms $a_{io}$ and $a_{ij}$ are constants. However, the operation of a cracking apparatus is adequately approximated by a linear model only over a rather limited range of operating conditions. Thus, and according to this invention, means are provided for updating the value of the constant terms in equations (1) each time the optimization procedure is performed.

A set of yield equations are used to perform the updating procedure. These equations are of the form:

$$V_m = b_{mo} + \sum_n b_{mn} U_n$$

(2)

Here the independent variables, $U_n$, are defined as follows:

$$U_1 = FFR;$$
$$U_2 = SLURR + HCORR/FFR;$$
$$U_3 = SLURR/HCORR;$$
$$U_4 = RXTEMP;$$
$$U_5 = RXLEV;$$
$$U_6 = CATCR/FFR + HCORR + SLURR; \text{ and}$$
$$U_7 = SSR/CATCR.$$

In the definition of $U_7$, the term SSR indicates the rate at which stripping steam is supplied through conduit 42, and it is assumed to be constant. The dependent variables in the equations (2) above are $C_2^=R$, $C_3^=R$, $C_3R$, $C_4^=R$, $iC_4R$, $nC_4R$, BFGR, COKER, LCOTEMP, and SLUSG. The coefficients $b_{mn}$ are experimentally determined for numerous different operating conditions of the cracking apparatus. The forms of the independent variables, $U_n$, are determined for convenience in making the experimental determinations of the constants $b_{mn}$.

Three further equations are used in updating the constants in equations (1). Two are heat balance equations, one taken around regenerator 12 and another around reactor 10, and one is the profit equation.

The regenerator heat balance equation uses the control volume indicated by the dashed line 130 in FIG. 1 and equates the rate of heat flow into that control volume to the rate of heat flow out of the control volume. The resultant equation is as follows:

$$[COKER \times HCOKE] + [COKER \times LBAIR/LBCOKE \times CPAIR \times (AIRTEMP - RGTEMP)] + [CATCR \times CPCAT \times (RXTEMP - RGTEMP)] = [SSR \times HSTM \times (RGTEMP - STMTEMP)] + [GASR \times CPGAS \times (GASTEMP - RGTEMP)] + [CATCR \times CPCAT (RGTEMP - CATCONTEMP)] - QLOSSRG.$$
(3)

The terms included in equation (3) not previously discussed are defined as follows:

$HCOKE =$ the heat of combustion of the coke formed on the catalyst particles;
$LBAIR/LBCOKE =$ the ratio between the mass of air required for complete combustion of a mass of coke formed on the catalyst particles;
$CPAIR =$ the heat capacity of the air supplied to the regenerator;
$AIRTEMP =$ the temperature of the air supplied to the regenerator;
$CPCAT =$ the heat capacity of the catalyst;
$HSTM =$ the heat capacity of the steam supplied to the regenerator coils;
$STMTEMP =$ the temperature of the steam supplied to the regenerator coils;
$GASR =$ the rate of flow of flue gas through conduit 50;
$CPGAS =$ the heat capacity of the flue gas removed from the regenerator;
$GASTEMP =$ the temperature of the flue gas removed from the regenerator;
$CATCONTEMP =$ the temperature of the catalyst in the catalyst conduit 22 at some desired point along that conduit, such as that point immediately preceding the point of interjection of feed from conduit 20 and recycled slurry from conduit 38; and
$QLOSSRG =$ the net heat loss through the control volume 130 not otherwise accounted for, such as by radiation from the regenerator housing.

The value of $HCOKE$ may be calculated by analyzing the hydrogen and carbon content of the coke, relatively invariant quantities, and multiplying those contents by the heats of combustion of the components as obtained from the literature, e.g., Hougen, Watson, and Ragatz, Chemical Process Principles, Part 2 (John Wiley & Sons, Inc.). The value of CPGAS may be determined by using analyzer 119 to determine the contents of the flue gas in conduit 50, in particular, the ratio of relative masses of carbon dioxide and carbon monoxide and the mass percent of nitrogen and oxygen in the flue gas and similarly combining these data with the data on the separate components contained in Hougen, Watson, and Ragatz, cited above.

In equation (3), the first bracketed term represents the heat generated by the combustion of the coke, the second the heat flow into the control volume from the air in conduit 46, the third the net heat flow into the control volume from the catalyst circulated through conduits 22 and 40, the fourth the net heat flow out of the control volume from the steam circulated through coils 54, the fifth the heat flow out of the control volume from the flue gases in conduit 50, and the last the heat losses from catalyst conduit 22 between the bottom of the reactor and the boundary of the control volume such as by radiation. As will be apparent to those skilled in the art, measurements of certain of the cracking apparatus operating parameters must be taken to determine the values of certain ones of the terms used in equation (3) by means not shown in FIG. 1.

The reactor heat balance equation uses the control volume indicated by the dashed line 132 in FIG. 1 and equates the rate of heat flow into that control volume to the rate of heat flow out of the control volume. The resultant equation is as follows:

$$[FFR \times CPFF \times (FTEMP - RXTEMP)] + [HCORR \times CPHCO \times (FTEMP - RXTEMP)] + [SLURR \times (SLUHVAP + CPSLU \times SLUTEMP - CPSLU \times RXTEMP)] + [CATCR \times CPCAT \times (CATCONTEMP - RXTEMP)] = QREAC + QLOSSRX$$
(4)

The terms included in equation (4) not previously discussed are defined as follows:

$CPFF =$ the heat capacity of the fresh feed in vaporized form supplied to the reactor;
$CPHCO =$ the heat capacity of the heavy cycle oil in vaporized form supplied to the reactor;
$SLUHVAP =$ the heat of vaporization of the slurry supplied to the reactor;
$CPSLU =$ the heat capacity of the slurry supplied to the reactor;
$SLUTEMP =$ the temperature of the slurry supplied to the reactor;
$QREAC =$ the heat generated by the reaction occurring in the reactor; and
$QLOSSRX =$ the net heat loss through the control volume 132 not otherwise accounted for, such as by radiation from the reactor housing.

In equation (4), the first bracketed term represents the net heat into the control volume from the fresh feed, the second the net heat into the control volume from the recirculated heavy cycle oil, the third the net heat into the control volume from the recirculated slurry, the fourth the net heat into the control volume from the catalyst flow, and the last the net heat into the control volume from the flow of stripping steam. QREAC may be calculated from an analysis of the contents of the mass streams entering and leaving the reactor, as is well known to those skilled in the art. Analyses of this type are reported in Dart and Oblad, "Heat of Cracking and Regeneration in Catalytic Cracking," Chemical Engineering Progress, Vol. 45, No. 2, February, 1949, pp. 110–118. Preferably, the methods there shown should be used with data from the specific apparatus being optimized. Since the reference temperature in equation (4) is taken as the reactor temperature and the temperature of the cracked gases in conduit 28 is approximately the same as the reactor temperature, a term representing the heat removed from the control volume by the flow of cracked gases will drop out and need not be included in the equation. As with equation (3), measurements of certain of the cracking apparatus operating parameters must be taken to determine the values of certain ones of the terms used in equation (4) by means not shown in FIG. 1. In both equations (3) and (4), terms representing the kinetic and potential energy of the input and output streams are small enough to ignore.

As mentioned, the constants in the equations (1) are updated each time the optimization procedure is to be performed. This is done by first solving the heat balance equations using the present values of all the terms therein to determine the values of the QLOSSRG and QLOSSRX terms. The $b_{mo}$ terms are then calculated from the equations (2) making use of the present measured values of the quantities $V_m$ and $U_n$. Then one of the independent variables $X_j$ in equations (1) is incremented by a predetermined amount. The increment is normally the move limit imposed on that variable, but if the difference between the present value and the maximum and/or minimum limit is less than the move limit, then that difference is used. The resultant changes in the variables $U_n$ in equations (2) are determined. The yield equations (2) and heat balance equations (3) and (4) are solved to determine the changes in the dependent variables $V_m$ of equations (2) and the catalyst circulation rate and regenerator temperature, the values of QLOSSRG and QLOSSRX being assumed as equal to those previously calculated.

An iterative procedure based on present conditions is used to effect this solution of the set of equations (2), (3) and (4). Thus the appropriate changes are made in variables $U_n$ according to the incremented values of $X_j$ and it is initially assumed that all other $U_n$'s remain constant. Equations (2) are solved to determine a first approximation to the values of independent variables $V_m$. These approximations of $V_m$ are then substituted into the heat balance equations (3) and (4) to determine a first approximation of the new values of catalyst circulation rate and regenerator bed temperature. The first approximation of catalyst recirculation rate is then used in variables $U_n$ and equations (2) solved to determine a second approximation to the values of $V_m$. The second approximations to variables $V_m$ are then used to determine a second approximation of the new values of catalyst circulation rate and regenerator bed temperature. This process is repeated until the values determined for catalyst circulation rate and regenerator bed temperature converge, i.e., the differences between successive approximations to each of these quantities are below predetermined amounts.

The function expressing the objective variable, here PROR, is of the following form:

$$PROR = (P_1 = C_2^- R) + (P_2 \times C_3^- R) + (P_3 \times C_3 R) + (P_5 \times C_4^- R) + (P_6 \times ic_4 R) + (P_7 \times nC_4 R) + (P_8 \times BFGR) - (C \times FFR)$$

(5)

In equation (5), the values of $P_1$ through $P_8$ represent the prices for which the respective products with which they are associated might be sold and $C$ represents the cost of the fresh feed supplied to the reactor. As will be obvious to those skilled in the art, other terms could be included in the profit equation if desired.

From the solution to equations (2), (3), (4) and (5) which result, the new values for dependent variables $Y_i$ in equations (1) are determined. In this connection, it should be noted that once COKER is determined from equations (2), AIRR may easily be determined for use in equations (1) and, similarly, once the various rate terms forming variables $V_m$ are determined, LCOYIELD may easily be determined. the value of $a_{ij}$ for the variable $X_j$ which was incremented may be found simply by dividing the resultant changes in independent variables $Y_i$ by the incremental change made in $X_j$. This entire process must, of course, be performed six times to obtain the values of all the $a_{ij}$'s of equations (1). When all the $a_{ij}$'s for a given value of $i$ are determined, the corresponding value of $a_{io}$ may be determined by substituting into the equation (1) for $Y_i$ the values of $a_{ij}$ and the known values of $X_j$ and $Y_i$.

Once the values of all $a_{io}$ and $a_{ij}$ are determined, the values for independent variables $X_j$ required to maximize the profit function defined by one of the equations (1), i.e., the objective function, are determined using the simplex linear programming technique. This technique is well known and need not be described in detail here. It is fully described at Churchman, Ackoff, and Arnoff, Introduction to Operations Research (John Wiley & Sons, Inc., New York, 1957) at pages 304–334, Froberg, Introduction to Numerical Analysis (Addison-Wesley Publishing Co., Inc., Reading, Mass., Palo Alto, and London, 1965), pages 309–320, and Levin and Lamone, Linear Programming for Management Decisions (Richard D. Irwin, Inc., Homewood, Illinois, 1969). Moreover, digital computer programs for executing the simplex technique are well known and commercially available. An example of such a program and an explanation of it use are included at pages 291–298 of Levin and Lamone, previously cited.

A simplified block diagram of a program for a digital computer which might be used to perform the optimization procedure described above is shown in FIG. 2. The program is entered through an initial entry box 200 and passes through an entry box 202 to an alternative box 204. The alternative box 204 determines whether it is time to perform the optimization procedure. If not, the program is re-entered through entry box 202 after a set time delay provided by an operation box 206. If so, the program passes to an operation box 208 which reads the present operating parameters of the cracking apparatus of FIG. 1 from transducers such as those at 62, 68, 74, 80, 87, 92, 98, 104, 110, and 114 and analyzers 116, 117, 118 and 119, but, as explained above, there may be means included for reading other operational parameters of the cracking apparatus. In some applications of this invention, it may be desirable for operation box 208 to include means for reading one or more of the operational parameters a plurality of different times and either taking an average of those readings in order to reduce the effect of noise or ascertaining whether the difference between successive readings of the parameters is below a predetermined level so that the optimization procedure will be performed only after the cracking apparatus has achieved steady state operation.

After the present operating parameters are determined, an operation box 210 solves equations (3) and (4) above for the heat loss terms QLOSSRG and QLOSSRX, respectively. An operation box 212 retrieves from storage all values of $b_{mn}$ for use in equations (2) dependent upon the present operating parameters of the cracking apparatus. An operation box 214 then sets the values of the $b_{mo}$ constants in equations (2) to the values calculated from the present values of the variables $V_m$ and $U_n$ and the retrieved values of $b_{mn}$. With the heat loss, $b_{io}$ and $b_{mn}$ terms evaluated, it is then possible to determine the values of the $a_{ij}$ constants using the iterative procedure discussed above.

To determine the $a_{ij}$'s, the program passes through an entry box 216 to an operation box 218 which increments one of the independent variable in equations (1), $X_j$. An operation box 220 then determines the new values for the independent variables in equations (2), $U_n$, corresponding to the incremented value $X_j$, and operation box 222 performs successive iterations through equations (2), (3), and (4) to determine the values of the dependent variables in equations (2), $V_m$, and then solves equation (5) for the corresponding value of PROR. The values $V_m$ and PROR are used by an operation box 224 to determine the values of all $a_{ij}$'s for the variable $X_j$ incremented by operation box 218. An alternative box 226 determines whether each variable $X_j$ has been incremented during the present run of the program. If not, the program returns to entry box 216, the next variable $X_j$ is incremented, and it continues to find the values of all $a_{ij}$'s associated with that $X_j$. If all the $X_j$ variables have been incremented, the program goes to an operation box 227 which determines the values of all the $a_{io}$'s. An operation box 228 then uses the calculated $a_{io}$'s and $a_{ij}$'s to determine the values for the variables $X_j$ in equations (1) required to maximize PROR using the simplex technique. In some uses of the program of FIG. 2, it may be desirable to convert the system of equations (1) to another form prior to operation box 228 in order that they might be more readily used by available simplex optimization programs. If this is the case, then operation box 228 will be followed by an operation box which converts the values of the variables solved for by box 228 back into the form of equations (1).

An alternative box 230 checks the optimum values of all $X_j$'s determined by operation box 228 to see that each is within its maximum and minimum limits and to see that the difference between the present value of that variable and the determined optimum value does not violate the move limits. Alternative box 230 also checks to see that all the constrained variables will be within their limits when the determined optimum values for the controlled variables are used. If the limits on either the controlled or constrained variables are violated, an operation box 232 prints an error signal to the operator. If all the controlled and constrained variables are within their limits, operation box 234 applies the determined optimum values of $X_j$ as the set points to the controllers 64, 70, 76, 82, 88 and 94 in FIG. 1. Finally, an operation box 236 sets the next time at which the optimization procedure should next be run.

It may thus be seen that methods and apparatus for optimizing the operation of a process unit and, in particular, a catalytic cracking apparatus have been described which fulfill all of the above-mentioned objects. The optimization systems of this invention may be used continuously in an on-line basis as described above. Alternatively, they may be used off-line or only sporadically. For example, the optimization procedure described might be used once to determine the optimum values of the controlled variables. The determined optimum values could then be used until a change in external conditions, such as the composition or cost of the available fresh feed or the prices at which one or more of the output products may be sold, required the calculation of a new set of optimum values. Further, the input operating parameters and the output set points might be manually read into and out of the computer network rather than automatically as described.

Further, it will be obvious that many modifications of the specific embodiment shown may be made without departing from the spirit and scope of this invention. For example, this invention might be used to control the operation of many types of apparatus other than the catalytic cracking apparatus shown in FIG. 1. Many more controlled and/or constrained variables could be added to the model described. Many different operating parameters of the apparatus may be chosen as the controlled and constrained variables. Many different forms of equations could be used for the yield equations and the heat balance equations.

While a particular embodiment of this invention is described above, it will be understood, of course, that the invention is not to be limited thereto, since many modifications may be made. It is contemplated, therefore, by the appended claims, to cover any such modifications as fall within the true spirit and scope of this invention.

I claim:

1. The method for controlling the operation of a petroleum catalytic cracking apparatus operated in conjunction with a petroleum fractionator, said apparatus comprising a fluidized bed catalytic reactor and a fluidized bed catalyst regenerator and with said fractionator being operative on an input petroleum feed stream to produce a plurality of output product streams and having a set of controlled operational parameters which desirably will not violate certain limiting values and which may be altered to establish a desired operating condition of said apparatus and a set of constrained operational parameters which desirably will not violate certain limiting values, said method comprising the steps of:

sensing the rates of generation of said output streams, said constrained parameters, and said controlled parameters;

using a set of linear equations to express relationships between the rates of generation of said output streams, said objective variable quantity, said constrained parameters, and said controlled parameters;

determining the values of the rates of generation of said output streams, said objective variable quantity, said constrained parameters, and said controlled parameters corresponding to an operating condition of said apparatus;

evaluating the constants included in said linear equations by using the determined values of the rates of generation of said output streams, said objective variable quantity, said constrained parameters, and said controlled parameters, incrementing the values of said controlled parameters, and determining the corresponding alteration in the rates of generation of said output streams, said objective variable quantity, and said constrained parameters;

solving said linear equations with said evaluated constants to determine the values of said controlled parameters required to optimize said objective variable quantity; and altering said controlled parameters toward said determined values.

2. The method of claim 1 further comprising using a set of linear inequalities to express said limits on said controlled operational parameters and said constrained operational parameters and said solving step comprises using said linear inequalities and said equations with said evaluated constants to determine the values of said controlled parameters required to optimize said objective variable quantity without violating said limits.

3. The method of claim 2 wherein the rate of change of certain ones of said controlled operational parameters desirably will not violate certain limiting values further comprising imposing move limits on the value of said operational parameters representing the maximum departure permitted from said determined value of said controlled parameters and including said move limits in said set of linear inequalities.

4. The method of claim 1 wherein said solving step uses a simplex linear programming technique.

5. Apparatus for controlling the operation of a petroleum catalytic cracking apparatus operated in conjunction with a petroleum fractionator to optimize an objective variable quantity associated with the operation of said cracking apparatus, said cracking apparatus comprising a fluidized bed catalytic reactor and a fluidized bed catalyst regenerator and with said fractionator being operative on an input petroleum feed stream to produce a plurality of output product streams and having a set of controlled operational parameters which may be altered to establish a desired operating condition of said cracking apparatus and a set of dependent operational parameters, said control apparatus comprising:

means for sensing the values of said controlled parameters, said dependent parameters, and the rates of generation of said output streams and generating a first plurality of signals related to the values of said controlled parameters, said dependent parameters, and the rates of generation of said output streams;

means for linearly combining according to a plurality of constants of combination said signals related to the values of said controlled parameters to form a second plurality of signals related to the values of said dependent parameters and the rates of generation of said output streams;

means for evaluating said constants of combination making use of said first plurality of signals and including means for incrementing the signals representative of said controlled parameters and determining the corresponding alteration in said dependent parameters and the rates of generation of said output streams;

means for solving said linear combination with said evaluated constants and determining the values of said controlled parameters required to optimize said objective variable quantity; and means for altering said controlled parameters toward the determined values of said controlled parameters required to optimize said objective variable quantity.

6. The apparatus of claim 5 wherein certain of said controlled operational parameters and said dependent parameters desirably will not violate certain limiting values and further comprising means for establishing limiting values on said certain ones of said controlled operational parameters and said dependent parameters and said solving means comprises means for solving said linear combination with said evaluated constants for the values of said controlled parameters restricted by said established limits on said certain ones of said controlled parameters and said dependent parameters for the values of said controlled parameters required to optimize said objective variable quantity.

7. The apparatus of claim 6 wherein the rate of change of specified ones of said certain controlled parameters desirably will not violate certain limiting rate values and further comprising means for including said limiting rate values into the limiting values established in said specified ones of said certain controlled parameters.

8. The apparatus of claim 7 wherein said evaluating means comprises:

second means for combining said first plurality of signals and said second plurality of signals;

means for incrementing the value of one of said first plurality of signals; and means for iterating through said second combining means and determining the resultant changes in said dependent variables.

9. Apparatus for optimizing the operation of a fluidized bed petroleum catalytic cracking apparatus, said cracking apparatus comprising a fluidized bed catalytic reactor and a fluidized bed catalyst regenerator and operative to crack a petroleum feed stream into various fractions, operated in conjunction with a petroleum fractionator, said fractionator being operative to separate said cracked petroleum into a top product, a first intermediate relatively light product, a second intermediate relatively heavy product, and a bottom product with at least a portion of each of said second intermediate product and said bottom product being recycled to said catalytic cracking apparatus, said apparatus being operative to optimize the value of an objective variable quantity associated with the operation of said cracking apparatus and comprising:

first sensing means for generating first signals representative of first sensed parameters comprising the rate at which feed is introduced into said cracking apparatus, the temperature at which feed is introduced into said cracking apparatus, the level of the fluidized bed in said catalytic reactor, the temperature of the fluidized bed in said catalytic reactor, the rate at which said second intermediate product is recycled to said cracking apparatus, and the rate at which said bottom product is recycled to said cracking apparatus;

control means for maintaining said first sensed parameters at set point values;

second sensing means for generating second signals representative of second sensed parameters comprising the rate at which air is supplied to said catalyst regenerator, the temperature of the fluidized bed in said catalyst regenerator, the rate at which catalyst is supplied to said catalyst reactor, the rate at which stripping steam is supplied to said catalytic reactor, the specific gravity of said fractionator bottom product, the composition of said top product, and the composition of said second intermediate product;

means for linearly combining said first signals in accord with a set of constants of combination to generate signals representative of said second sensed parameters;

means for determining said constants of combination comprising means for incrementing the value of said first sensed signals applied to said combining means and means for determining the resultant corresponding change in said signals representative of said second sensed parameters;

means for determining the values of said first sensed parameters required to optimize said objective variable; and means for altering said control means set point values toward the determined values of said first sensed parameters required to optimize said objective variable.

10. The method of claim 3 wherein said evaluating step comprises the steps of:

using a set of yield and heat balance equations expressing relationships between various ones of said rates of generation of said output streams, said objective variable quantity, said constrained parameters, and said controlled parameters;

incrementing the values of one of said controlled parameters in said yield and heat balance equations; and solving said yield and heat balance equations to determine the resultant changes in said rates of generation of said output streams, said objective variable quantity, and said constrained parameters.

* * * * *

UNITED STATES PATENT OFFICE
CERTIFICATE OF CORRECTION

Patent No. 3,828,171                     Dated August 6, 1974

Inventor(s) DONALD E. GRIFFIN

It is certified that error appears in the above-identified patent and that said Letters Patent are hereby corrected as shown below:

In the title change "QUALITY" to --QUANTITY--;

Column 8, line 5, "$\Sigma$" should be --$\underset{j}{\Sigma}$--;

Column 9, line 18, at the end of the line, "—" should be --+--;

Column 11, line 57, "($P_1$=" should be --($P_1$ x--;

Column 12, line 37, "it" should be --its--;

Column 13, line 13, "variable" should be --variables--.

Signed and sealed this 5th day of November 1974.

(SEAL)
Attest:

McCOY M. GIBSON JR.            C. MARSHALL DANN
Attesting Officer              Commissioner of Patents